United States Patent [19]

Motoyama

[11] Patent Number: 5,649,120

[45] Date of Patent: *Jul. 15, 1997

[54] METHOD AND APPARATUS FOR CONTROLLING AND COMMUNICATING WITH BUSINESS OFFICE DEVICES

[75] Inventor: Tetsuro Motoyama, San Jose, Calif.

[73] Assignees: Ricoh Company, Ltd., Tokyo, Japan; Ricoh Corporation, San Jose, Calif.

[*] Notice: The term of this patent shall not extend beyond the expiration date of Pat. No. 5,544,289.

[21] Appl. No.: 698,068

[22] Filed: Aug. 15, 1996

Related U.S. Application Data

[63] Continuation of Ser. No. 562,192, Nov. 22, 1995, Pat. No. 5,568,618, which is a continuation of Ser. No. 473,780, Jun. 6, 1995, Pat. No. 5,544,289, which is a continuation of Ser. No. 426,679, Apr. 24, 1995, Pat. No. 5,537,554, which is a continuation of Ser. No. 282,168, Jul. 28, 1994, Pat. No. 5,412,779, which is a continuation of Ser. No. 902,462, Jun. 19, 1992, abandoned, which is a continuation of Ser. No. 549,278, Jul. 6, 1990, abandoned.

[51] Int. Cl.$^6$ .............................. G06F 3/00; G03G 15/00
[52] U.S. Cl. ..................... 395/280; 358/442; 399/8
[58] Field of Search ................. 395/280, 184.01, 395/183.22, 912; 355/205; 358/404, 406, 442

[56] References Cited

U.S. PATENT DOCUMENTS

| | | | |
|---|---|---|---|
| 4,947,345 | 8/1990 | Paradise et al. | 358/442 |
| 4,965,676 | 10/1990 | Ejiri et al. | 358/406 |
| 5,361,265 | 11/1994 | Weinberger et al. | 395/184.01 |
| 5,544,289 | 8/1996 | Motoyama | 395/280 |

*Primary Examiner*—Glenn A. Auve
*Attorney, Agent, or Firm*—Oblon, Spivak, McClelland, Maier & Neustadt, P.C.

[57] ABSTRACT

A method and apparatus for controlling and communicating with business office devices, such as copiers, facsimiles and/or printers. The present invention communicates and controls various modules of business devices which allow an external device such as an operation panel to access the state of a target device, such as a copier, printer or facsimile. The operation panel can communicate with the target device and control the same target device. Also, a remote diagnostics station can provide remote diagnostics of the target device.

171 Claims, 6 Drawing Sheets

TYPE
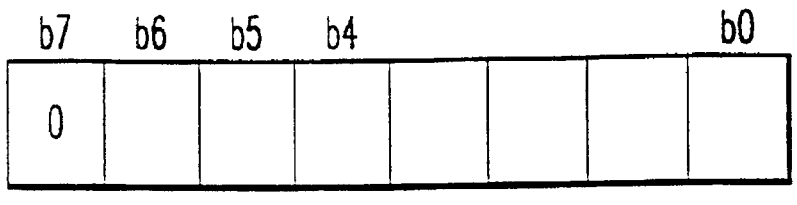
INFORMATION
00 NORMAL
01 ERROR
10 COMPOSITE
11 URGENT
TYPE NUMBER
1-30 TYPE
11111 EXTENSION.....00H 00H
LENGTH
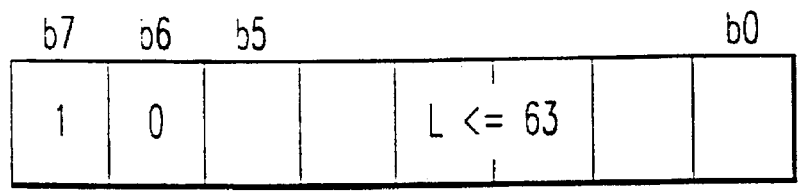
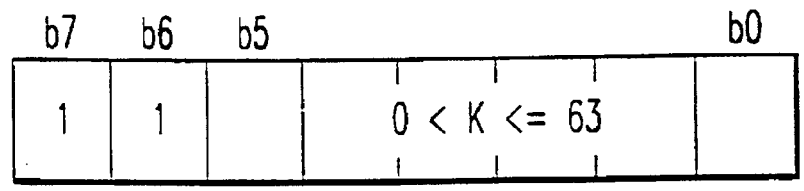
FOLLOWING K BYTES SPECIFY THE LENGTH
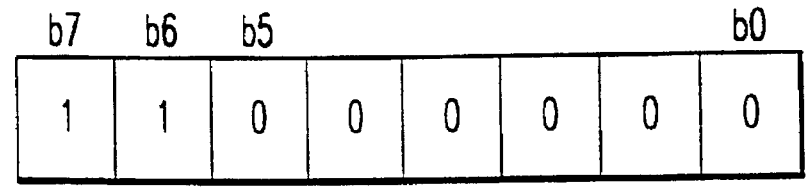
INDEFINITE
*FIG. 3*

| Engine Power On | | Panel Power On | Data | Comment |
|---|---|---|---|---|
| 1 | ↓ | | 02, 81, 02 | Identifying as Ope. Panel Engine is busy for power-on reset |
| 2 | ↑ | | 02, 81, 01 | Engine identifying itself |
| 3 | ↓ | | 01, 81, 02 | Ack Identify (02) |
| 4 | ↓ | | 02, 81, 02 | First Identify timed out. Try again |
| 5 | ↑ | | 01, 81, 02 | Ack Identify (02) Connection established. |
| 6 | ↓ | | 03, 81, 04 | # of copies specified. |
| 7 | ↑ | | 01, 81, 03 | Ack # of copies (03) |
| 8 | ↑ | | 04, 80 | Start |
| 9 | ↓ | | 01, 81, 04 | Ack Start (04) |
| 10 | ↑ | | 61, 80 | Paper Jam |
| 11 | ↓ | | 01, 81, 61 | Ack Paper Jam |

FIG.—4

| ENGINE | DIAG. | DATA | COMMENT |
|---|---|---|---|
| 1 | ↓ | 02, 81, 03 | IDENTIFYING DIAGNOSTIC SYSTEM |
| 2 | ↑ | 01, 81, 02 | ACK IDENTITY |
| 3 | ↓ | 06, 81, 01 | INQUIRY IDENTITY |
| 4 | ↑ | 41, 86, 01, 81, 06, 07, 81, 01 | COMPOSITE ACK. ACK INQUIRY & REPORT MODEL = 1 |
| 5 | ↓ | 06, 81, 02 | INQUIRY MODEL |
| 6 | ↑ | 41, 86, 01, 81, 06, 07, 81, 02 | COMPOSITE ACK. ACK INQUIRY & REPORT MODEL = 2 |
| 7 | ↓ | 09, 84, 00, 01, 00, 02 | PARAMETERS (1, 2) REPORT |
| 8 | ↑ | 21, 81, 09 | COMMAND NOT UNDERSTOOD |
| 9 | ↓ | 08, 84, 00, 00, 01, C1 | REPORT ADDRESS (01C1) CONTENT |
| 10 | ↑ | 01, 81, 08 | ACK |
| 11 | ↓ | 07, 87, 00, 00, 01, C1, 3D, FF | REPORT 01C1 = FF |
| 12 | ↑ | 01, 81, 07 | ACK |

*FIG. 5*

METHOD AND APPARATUS FOR CONTROLLING AND COMMUNICATING WITH BUSINESS OFFICE DEVICES

This is a Division, of application Ser. No. 08/562,192, filed on Nov. 22, 1995 U.S. Pat. No. 5,568,618, which is a Continuation of application Ser. No. 08/473,780 filed on Jun. 6, 1995, now issued as U.S. Pat. No. 5,544,289 which is a Continuation of application Ser. No. 08/426,679 filed on Apr. 24, 1995, now issued as U.S. Pat. No. 5,537,554, which is a Continuation of application Ser. No. 08/282,168, filed on Jul. 28, 1994, now issued as U.S. Pat. No. 5,412,779, which is a Continuation of application Ser. No. 07/902,462, filed on Jun. 19, 1992, now abandoned, which is a Continuation of application Ser. No. 07/549,278, filed on Jul. 6, 1990, now abandoned.

BACKGROUND OF THE INVENTION

The present invention relates to a method and apparatus for communicating and controlling various types of business office equipment or devices transparently and uniformly. The types of business equipment could be copiers, facsimiles and/or printers.

The creation of business office devices such as a copier, facsimile or printer requires activities assigned to various groups which must be integrated into at a certain time. In addition, once the device goes to customers, it must be maintained by a field service group. Therefore, different groups of people work together to develop and maintain the product.

The current trend of using microprocessors in business devices increased the capability of the devices. For example, high speed copiers usually have more than one microprocessor performing various tasks, including an operation panel consisting of many buttons and displays, controlled by a microprocessor.

As the use of microprocessors increases, a shortage of software engineers becomes critical. Fathi and Armstrong (1985) showed the cost ratio of development between hardware and software as 1 to 5.3. The current practice of developing devices, particularly stand-alone devices such as copiers, tends to ignore reusability of software across different models. For example, an operation panel of a copier is programmed by an engineer who develops the software of the main controller. The software is closely tied to a particular model and usually cannot be used by other copier models. If this trend does not change, the development of various modules by different groups cannot be easily integrated. Moreover, the shortage of software engineers is likely to limit the number of product developments and modification.

SUMMARY OF THE INVENTION

The foregoing problems can be solved and product development cycles can be shortened by providing a means and corresponding method to communicate and control various modules of a device across models and products. This allows several groups to start developing modules using existing devices rather than waiting for a target device to be developed. In addition, field service organization can support diagnostic and maintenance activities with one intelligent system, rather than having different systems for various products.

It is therefore an object of the present invention to provide an improved means and method of allowing an external device or devices to access the state of the target device(s), to communicate with the target device(s) and to control the target device(s).

Additional objects, advantages and novel features of the present invention will be set forth in part in the description which follows and in part become apparent to those skilled in the art upon examination of the following or may be learned by practice of the invention. The objects and advantages of the present invention may be realized and attained by means of the instrumentalities and combinations which are pointed out in the appended claims.

BRIEF DESCRIPTION OF THE DRAWINGS

The accompanying drawings which are incorporated in and form a part of this specification illustrate and embodiment of the invention and, together with the description, serve to explain the principles of the invention.

FIG. 3 depicts an encoding scheme which can be used for communication with the present invention.

FIG. 4 depicts an example of a handshake between a copier engine and operation panel after power-up.

FIG. 5 depicts an example of how a diagnostic station can be connected in accordance with the present invention.

DETAILED DESCRIPTION OF THE INVENTION

Reference will now be made in detail to the preferred embodiment of the invention, an example of which is illustrated in the accompanying drawings. While the invention will be described in conjunction with the preferred embodiment, it will be understood that it is not intended to limit the invention to that embodiment. On the contrary, it is intended to cover alternatives, modifications and equivalents as may be included within the spirit and scope of the invention as defined by the appended claims.

Figure 1:
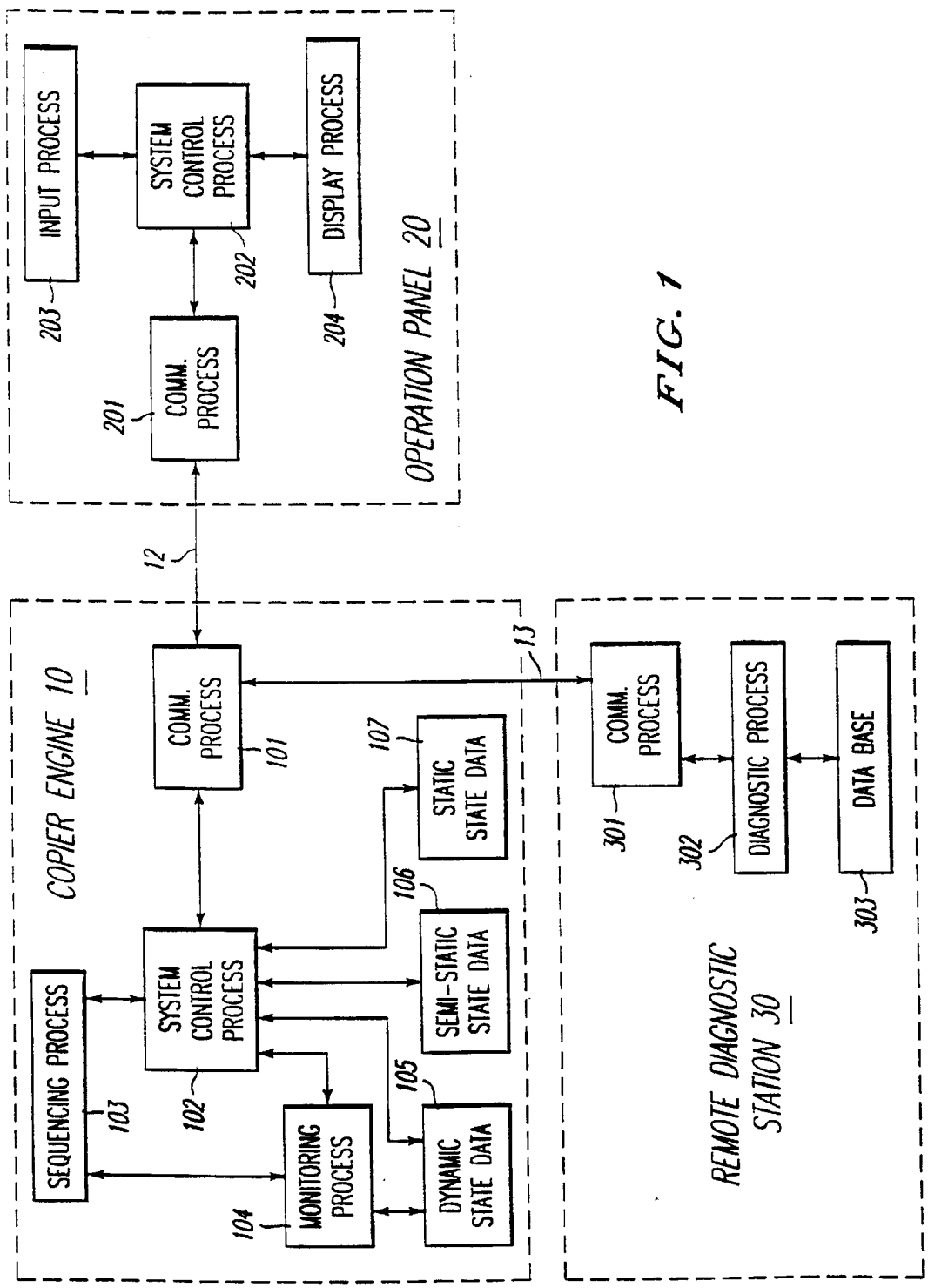
FIG. 1 depicts a functional system overview under which the present invention can be applied.

FIG. 1 illustrates a preferred embodiment of the present invention including a copier engine 10, operation panel 20, and remote diagnostic station 30. However, the present invention is not limited to copier devices, and can be applied to other business equipment devices, such as a printer which, for example, receives character codes representing characters and prints characters which correspond to the character codes, or facsimile, which has means which are described below.

In the following illustration, the target device in FIG. 1 is a copier engine 10. The target device 10 includes therein means to store Static State Data 107, which does not change over the life of the device, such as the model number, serial number, model characteristics and the like. Target device 10 includes means to store Semi-Static State Data 106, which may change over the life of the device infrequently, such as the ROM version, option configuration, and the like.

In addition, the target device has means to store Dynamic State Data 105, which changes according to the mechanical state of the device, such as the paper status in the tray, oil, toner, number of prints, sensitivity of the photo-receptor, paper path and location, and the like. In order to store the dynamic state of the device, the target device 10 includes Monitoring Process 104 to monitor the state of device 10. Overall system activities are coordinated by System Control Process 102.

At power-on time, System Control Process 102 not only brings up the target device 10, but also establishes the communication with attached devices by first checking the physical connection and then establishing the communication by means which will be described below.

Copier engine 10 is idle until a user specifies some function through Operation Panel 20. During the idle time, however, System Control Process 102 continuously monitors its state through Monitoring Process 104. If abnormal states are detected, System Control Process 102 sends data to Communication Process 101, which codes data and sends the coded data to the Operation panel 20 through communication media line 12. Communication Process 201 sends acknowledgement, decodes data and sends it to System Control Process 202. System Control Process 202 then notifies the state of Copier Engine 10 through Display Process 204.

If communication line 13 to Remote Diagnostic Station is connected, System Control Process 102 can send a message to get the attention of Remote Diagnostic Station 30 to notify station 30 of an abnormal state.

Input Process 203 receives input from a user and sends the data to System Control Process 202, which then echoes back the input through Display Process 204, so that the user can get feedback of his/her input. The data from the user is then coded in Communication Process 201. The coded data is then sent to Copier Engine through line 12.

Communication Process 101 then sends an acknowledgement to 201, decodes the received data and sends the decoded data to System Contol Process 102. During the actual copying, Sequencing Process 103 sequences events according to timing requirements. Remote Diagnostic Station 30 is connected with Copier Engine 10 through line 13, which can be a telephone line, RS232 line, or any other suitable communication means. Communication process 301 acts similarly as process 101 and process 201 of engine 10 and panel 20, respectively.

Diagnostic Process 302 is an intelligent process which can communicate interactively with Copier engine 10 based upon the responses it receives and data accumulated in the Data Base 303.

Figure 2:
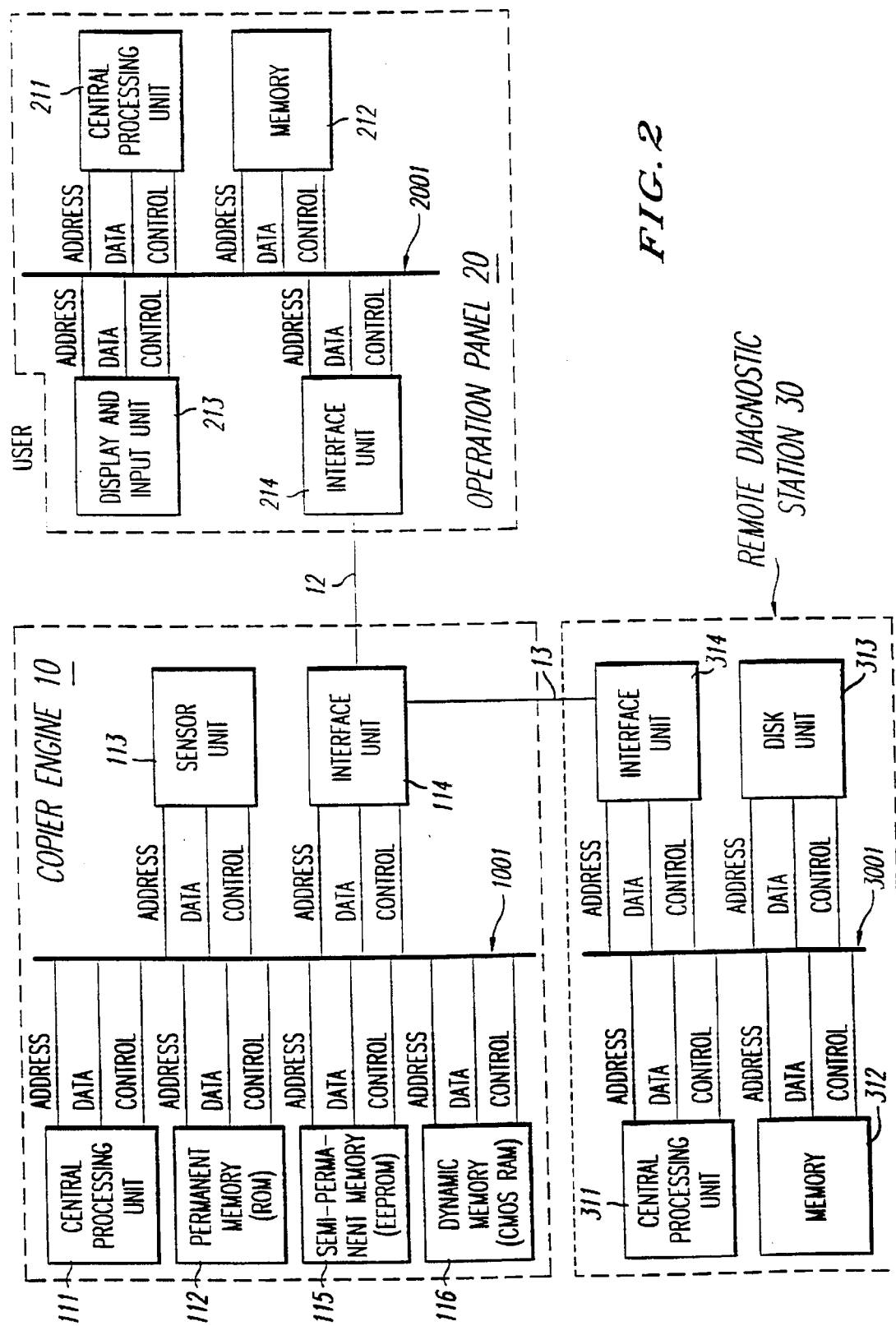
FIG. 2 depicts the hardware aspects of an implementation of the present invention.

FIG. 2 illustrates hardware features utilized to implement the present invention. All devices 10, 20, 30 have buses 1001, 2001, and 3001, which connect Interface Units 114, 214, and 314 respectively. Depending upon the model, a bus could have more units. Sensor unit 113 senses the mechanical states of the target device which must be stored as Dynamic Data, such as paper tray, voltage and paper path.

Memory 112 holds Static State Data 107 as a permanent memory (such as ROM). Memory 115 stores Semi-Static State Data 106 in changeable memory which does not require power, such as EEPROM, or which uses low power and can be supported by a battery (CMOS RAM). Memory 116 stores Dynamic State Data 105 in a changeable memory, which does not require power or which uses low power and can be supported by a battery.

Display and Input Unit 213 controls input keys and displays, such as lights and LCD. Disk unit 313 holds the data base. If the communication line 13 is not connected regularly or gets connected only when diagnostics are needed, the Interface Unit 114 has a means to notify Central Processing Unit 111 that line 13 is connected, such as an interrupt caused by mechanical means of physical connection.

FIG. 3 illustrates a preferred embodiment of encoding according to the present invention. However, other encoding such as ASN.1 (1987) can be used instead. The encoding scheme in FIG. 3 consists of sending Type, Length and Value (TLV) encoding. Bit 7 of Type is set to 0 while bit 7 of Length is set to 1. Values can take any bit combination. The encoding is binary to save the length of the data communication. Combined with the information field, up to 120 types (4 information×30 types) can be defined. One method to extend the type is to set all low 5 bits to 1. The terminator of this extension is two bytes of 00H. Using Composite in the information field, more than one information can be sent as follows:

010xxxxx L1 T2 L2 V2 T3 L3 V3 where L1 is the byte length of T2 through V3. L2 is the byte length of V2, and L3 is the byte length of V3. Composite is not limited to two.

Table 1 below shows codes for Type and Value. These codes are shown as an illustration, and actual implementation may vary depending upon the application.

TABLE I

| Information | Type and Value | |
|---|---|---|
| | Type | Content |
| 00 | 1 | Acknowledgement |
| 00 | 2 | Identify |
| 00 | 3 | # of Copies |
| 00 | 4 | Start |
| 00 | 5 | Done |
| 00 | 6 | Inquiry |
| 00 | 7 | Report |
| 00 | 8 | Address Content Report |
| 00 | 9 | Parameter Report |
| 01 | 1 | Command Not Understood |
| 10 | 1 | Composite Acknowledgement |
| 11 | 1 | Jam |
| Identify Values | | |
| | 1 | Copier Engine |
| | 2 | Operation Panel |
| | 3 | Diagnostic |
| Inquiry Values | | |
| | 1 | Identity |
| | 2 | Model |

FIG. 4 illustrates the establishment of communication between engine 10 and operation panel 20 of FIGS. 1 or 2 after power-on. Both engine 10 end operation panel 20 go through power on reset sequence. At step 1, operation panel 20 finishes the reset and sends its assigned value to engine 10. However, engine 10 is still busy with reset and cannot receive the data through the interface unit 101.

At step 2, engine 10 is ready and sends the assigned value to panel 20. Step 3 shows the acknowledgement from panel 20 to engine 10. In a preferred embodiment, the receiving side must return the acknowledgement with the received Type.

In FIG. 4, step 4 illustrates that a First Identify has timed out and another attempt should be made.

Step 5 illustrates that the connection has been established.

Step 6 illustrates an example of the number of copies specified and the acknowledgement in step 7 reflects the number of copies (here, 3 copies).

Step 8 illustrates the start of the copying sequence, and step 9 indicates the corresponding acknowledgement.

Step 10 illustrates the communication of a paper jam, and step 11 illustrates the corresponding acknowledgement of that paper jam.

FIG. 5 illustrates the process of establishing the connection between Diagnostic Station 30 and Copier Engine 10 of FIGS. 1 and 2. It is assumed that the engine power is on. FIG. 5 illustrates the use of Composite information field on lines 4 and 6. If Composite is not used, communication such as lines 10 through 12 is needed.

Step 1 in FIG. 5 illustrates the identifying of the diagnostic system, and step 2 illustrates the acknowledgement of the identification.

Step 3 illustrates the identification inquiry, and step 4 illustrates a composite acknowledgement.

Step 5 inquires as to the model identification, and step 6 is the corresponding acknowledgement.

Step 7 asks for a report of parameters and, as an illustration, step 8 illustrates the command is not understood.

Step 9 illustrates a reporting of address, and steps 10, 11 and 12 reflect the acknowledgement, report and acknowledgement, respectively.

Figure 6:
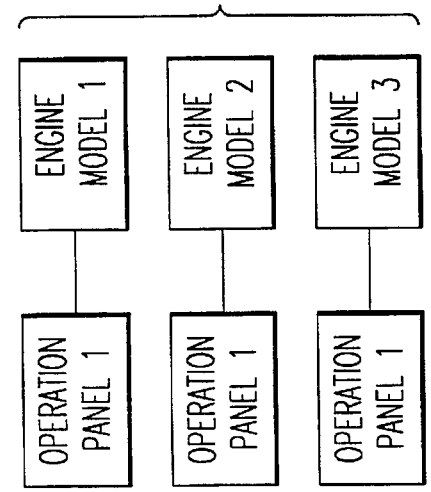

FIG. 6 shows an example of another embodiment of the present invention in which an operation panel 1 can control different types of engine models identified as Engine Model 1, Model 2 and Model 3.

Figure 7:
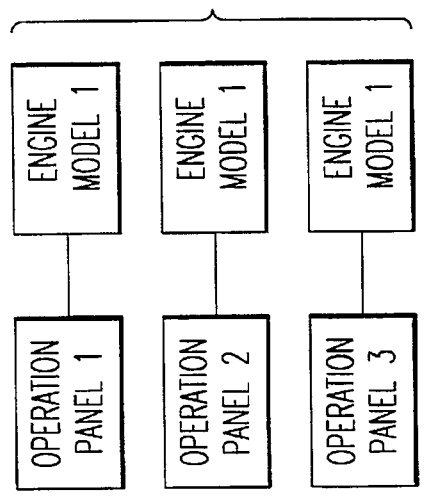

FIG. 7 shows an embodiment of the invention in which different operation panels such as panels 1, 2 or 3 can control the same engine models identified as engine model 1.

Figure 8:
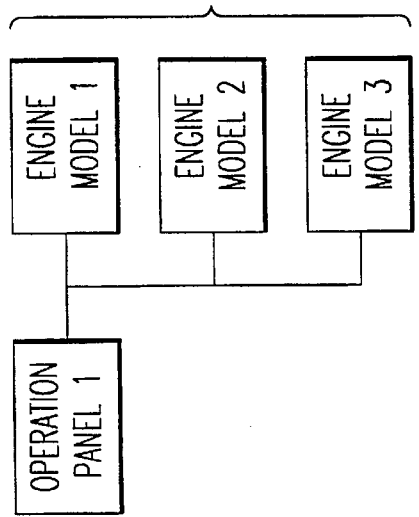
FIGS. 6–8 show examples of other embodiments of the present invention.

Finally, FIG. 8 shows an operation panel 1 controlling different engine models, identified as engine models 1, 2 and 3. In FIG. 8, operation panel 1 could control models 1, 2 or 3 by a suitable bus interconnection and suitable multiplexing capability.

In conclusion, the present invention provides a means and corresponding method for controlling, monitoring and communicating with office equipment devices by using the following:

Means to control various activities of the system (System Control Process)
Means to store static data (Static State Data)
Means to store semi-static data (Semi-Dynamic State Data)
Means to store dynamic data (Dynamic State Data)
Means to monitor the state of the device (Monitoring Process)
Means to get the state of device from the monitoring means and store the state into the storage of dynamic data (Monitoring Process→System Control Process) →Dynamic State Data)
Means to communicate with other devices such as RS232 or modem/telephone (Communication Process)
Means to identify itself to other devices (Communication Process)
Means to exchange commands and data such as reply (Communication Process)
Means to interpret commands (System Control Process)
Means to take actions based upon the commands (System Control Process)
Means to send results of actions (System Control Process→Communication Process)
Means to notify when the new communication line is established (Communication Process→System Control Process: Interface Unit-interrupt→CPU)

The foregoing description of the preferred embodiment of the present invention has been presented for purposes of illustration and description. It is not intended to be exhaustive or to limit the invention to the precise form disclosed, and many modifications and variations are possible in light of the above teaching. The preferred embodiment was chosen and described in order to best explain the principles of the invention and its practical applications to thereby enable others skilled in the art to best utilize the invention and various embodiments and with various modifications as are suited to the particular use contemplated. It is intended that the scope of the present invention be defined only by the claims appended hereto.

What is claimed is:

1. A business office device, comprising:
   an engine for performing mechanical functions in response to a command from a separate device;
   a memory for storing static state data of the engine;
   means for transmitting the static state data to the separate device;
   means for receiving data from the separate device which has been transmitted from the separate device after the means for transmitting transmits the static state data; and
   means for processing the data received by the means for receiving and for controlling the business office device in response to the processing.

2. A business office device according to claim 1, wherein:
   the memory stores the static state data which includes data which does not change over the life of the business office device; and
   the means for transmitting transmits the static state data which includes the data which does not change over the life of the business office device.

3. A business office device according to claim 1, wherein:
   the memory stores the static state data which includes a model number of the business office device; and
   the means for transmitting transmits the static state data which includes the model number of the business office device.

4. A business office device according to claim 1, wherein:
   the memory stores the static state data which includes a serial number of the business office device; and
   the means for transmitting transmits the static state data which includes the serial number of the business office device.

5. A business office device according to claim 1, wherein:
   the memory stores the static state data which includes model characteristics of the business office device; and
   the means for transmitting transmits the static state data which includes the model characteristics of the business office device.

6. A business office device, comprising:
   an engine for performing mechanical functions in response to a command from a separate device;
   a memory for storing semi-static state data of the engine;
   means for transmitting the semi-static state data to the separate device;
   a model identification memory which stores a model identification of the business office device;
   a model identification transmitting means which transmits the model identification from the business office device to the separate device;
   means for receiving data from the separate device which has been transmitted from the separate device after the means for transmitting transmits the semi-static state data; and
   means for processing the data received by the means for receiving and for controlling the business office device in response to the processing.

7. A business office device according to claim 6, wherein:
   the memory stores the semi-static state data which includes data which changes infrequently over the life of the business office device; and the means for transmitting transmits the semi-static state data which includes the data which changes infrequently over the life of the business office device.

8. A business office device according to claim 6, wherein:

the memory stores the semi-static state data which includes an option configuration of the business office device; and the means for transmitting transmits the semi-static state data which includes the option configuration of the business office device.

9. A business office device according to claim 6, wherein:

the memory stores the semi-static state data which includes a ROM version of the business office device; and the means for transmitting transmits the semi-static state data which includes the ROM version of the business office device.

10. A business office device according to claims 1 or 6, further comprising:

means for receiving an identity of the separate device from the separate device.

11. A business office device according to claims 1 or 6, wherein the separate device is an operation terminal, the business office device further comprising:

means for transmitting state data to a remote diagnostic station which is different from the separate device.

12. A business office device according to claim 11, further comprising:

means for receiving data from the remote diagnostic station.

13. A business office device according to claims 1 or 6, wherein the separate device is a remote diagnostic station, the business office device further comprising:

means for transmitting state data to an operation terminal which is different from the separate device.

14. A business office device according to claim 6, further comprising:

means for receiving data from the operation terminal.

15. A business office device according to claims 1 or 6, further comprising:

a scanner means for scanning documents.

16. A business office device, comprising:

a memory which stores static state data;

a transmitter configured to transmit the static state data to a separate device;

a receiver configured to receive data from the separate device which has been transmitted from the separate device after the transmitter transmits the static state data; and a processor configured to process the data received by the receiver and for controlling the business office device in response to the processing.

17. A business office device according to claim 16, wherein:

the memory stores the static state data which includes data which does not change over the life of the business office device; and the transmitter transmits the static state data which includes the data which does not change over the life of the business office device.

18. A business office device according to claim 16, wherein:

the memory stores the static state data which includes a model number of the business office device; and the transmitter transmits the static state data which includes the model number of the business office device.

19. A business office device according to claim 16, wherein:

the memory stores the static state data which includes a serial number of the business office device; and the transmitter transmits the static state data which includes the serial number of the business office device.

20. A business office device according to claim 16, wherein:

the memory stores the static state data which includes model characteristics of the business office device; and the transmitter transmits the static state data which includes the model characteristics of the business office device.

21. A business office device, comprising:

a memory which stores semi-static state data;

a transmitter configured to transmit the semi-static state data to a separate device;

a model identification memory which stores a model identification of the business office device;

a model identification transmitter configured to transmit the model identification from the business office device to the separate device;

a receiver configured to receive data from the separate device which has been transmitted from the separate device after the transmitter transmits the semi-static state data; and a processor configured to process the data received by the receiver and for controlling the business office device in response to the processing.

22. A business office device according to claim 21, wherein:

the memory stores the semi-static state data which includes data which infrequently changes over the life of the business office device; and the transmitter transmits the semi-static state data which includes the data which changes infrequently over the life of the business office device.

23. A business office device according to claim 21, wherein:

the memory stores the semi-static state data which includes an option configuration of the business office device; and the transmitter transmits the semi-static state data which includes the option configuration of the business office device.

24. A business office device according to claim 21, wherein:

the memory stores the semi-static state data which includes a ROM version of the business office device; and the transmitter transmits the semi-static state data which includes the ROM version of the business office device.

25. A business office device according to claims 1, 16, 6 or 21, wherein:

the memory is located within the business office device.

26. A business office device according to claims 16 or 21, further comprising:

a receiver configured to receive an identity of the separate device from the separate device.

27. A business office device according to claims 16 or 21, wherein the separate device is an operation terminal, the business office device further comprising:

a transmitter configured to transmit state data to a remote diagnostic station which is different from the separate device.

28. A business office device according to claim 27, further comprising:

a receiver configured to receive data from the remote diagnostic station.

29. A business office device according to claims 19 or 21, wherein the separate device is a remote diagnostic station, the business office device further comprising:

a transmitter configured to transmit state data to an operation terminal which is different from the separate device.

30. A business office device according to claim 29, further comprising:

a receiver configured to receive data from the operation terminal.

31. A business office device according to claims 16 or 21, wherein:

the processor is a microprocessor.

32. A business office device according to claims 16 or 21, further comprising:

a scanner mechanism.

33. A business office device for communication with an operation terminal, comprising:

a business office device engine for performing mechanical functions;

a memory which stores state data of the business office device;

a transmitting means for transmitting the state data to the operation terminal;

a receiving means for receiving a start command from the operation terminal;

means for starting operation of the business office device engine in response to receiving the start command;

means for receiving an identity of the operation terminal from the operation terminal; and means for processing the identity.

34. A business office device according to claim 33, wherein the business office device is a copier and the business office device engine is a copier engine.

35. A business office device according to claim 33, wherein the business office device is a printer and the business office device engine is a printer engine.

36. A business office device according to claim 35, wherein the business office device is a character printer and the business office device engine is a character printer engine.

37. A business office device, comprising:

a business office device engine means for performing mechanical functions;

a memory for storing state data;

means for transmitting the state data to a remote diagnostic station;

means for transmitting the state data to an operation terminal means which is different from the remote diagnostic station;

means for receiving commands from the operation terminal means;

means for processing commands which have been received including a command to start an operation of the business office device engine means;

means for receiving data from the operation terminal which has been transmitted from the operation terminal after the means for transmitting transmits the state data; and means for processing the data received by the means for receiving and for controlling the business office device in response to the processing.

38. A business office device according to claim 37, further comprising:

an interface means for connection to the operation terminal means; and an interface means for connection to the remote diagnostic station, wherein the interface means for connection to the operation terminal means is for connection to the operation terminal means at a same time as the interface means for connection to the remote diagnostic station is connected to the remote diagnostic station.

39. A business office device according to claim 37, wherein:

the business office device is a copier, and the business office device engine means is a copier engine means.

40. A business office device according to claim 37, wherein:

the business office device is a printer, and the business office device engine means is a printer engine means.

41. A system according to claim 37, wherein:

each of the means for processing comprises a microprocessor.

42. A business office device according to claims 37 or 33, wherein the business office device engine means comprises:

a scanner means for scanning documents.

43. A copier, comprising:

a copier engine which performs mechanical functions in response to a command from a separate device and includes a means for copying;

a memory for storing static state data of the copier engine;

means for transmitting the static state data to the separate device;

means for receiving data from the separate device which has been transmitted from the separate device after the means for transmitting transmits the static state data; and means for processing the data received by the means for receiving and for controlling the copier in response to the processing.

44. A copier according to claim 43, wherein:

the memory stores the static state data which includes data which does not change over the life of the copier; and the means for transmitting transmits the static state data which includes the data which does not change over the life of the copier.

45. A copier according to claim 43, wherein:

the memory stores the static state data which includes a model number of the copier; and the means for transmitting transmits the static state data which includes the model number of the copier.

46. A copier according to claim 43, wherein:

the memory stores the static state data which includes a serial number of the copier; and the means for transmitting transmits the static state data which includes the serial number of the copier.

47. A copier according to claim 43, wherein:

the memory stores the static state data which includes model characteristics of the copier; and the means for transmitting transmits the static state data which includes the model characteristics of the copier.

48. A copier, comprising:

a copier engine which performs mechanical functions in response to a command from a separate device and includes a means for copying;

a memory for storing semi-static state data of the copier engine;

means for transmitting the semi-static state data to the separate device;

means for receiving data from the separate device which has been transmitted from the separate device after the means for transmitting transmits the semi-static state data; and means for processing the data received by the means for receiving and for controlling the copier in response to the processing.

49. A copier according to claim 48, wherein:

the memory stores the semi-static state data which includes data which infrequently changes over the life of the copier; and the means for transmitting transmits the semi-static state data which includes the data which infrequently changes over the life of the copier.

50. A copier according to claim 48, wherein:

the memory stores the semi-static state data which includes an option configuration of the copier; and the means for transmitting transmits the semi-static state data which includes the option configuration of the copier.

51. A copier according to claim 48, wherein:

the memory stores the semi-static state data which includes a ROM version of the copier; and the means for transmitting transmits the semi-static state data which includes the ROM version of the copier.

52. A copier according to claims 43 or 48, further comprising:

means for receiving an identity of the separate device from the separate device.

53. A copier according to claims 43 or 48, wherein the separate device is an operation terminal, the copier further comprising:

means for transmitting state data to a remote diagnostic station which is different from the separate device.

54. A copier according to claim 53, further comprising:

means for receiving data from the remote diagnostic station.

55. A copier according to claims 43 or 48, wherein the separate device is a remote diagnostic station, the copier further comprising:

means for transmitting state data to an operation terminal which is different from the separate device.

56. A copier according to claim 53, further comprising: means for receiving data from the operation terminal.

57. A copier according to claims 43 or 48, wherein:

the means for processing comprises a microprocessor.

58. A copier, comprising:

a copying device;

a memory which stores static state data;

a transmitter configured to transmit the static state data to a separate device;

a receiver configured to receive data from the separate device which has been transmitted from the separate device after the transmitter transmits the static state data; and a processor configured to process the data received by the means for receiving and for controlling the copier in response to the processing.

59. A copier according to claim 58, wherein:

the memory stores the static state data which includes data which does not change over the life of the copier; and the transmitter transmits the static state data which includes the data which does not change over the life of the copier.

60. A copier according to claim 58, wherein:

the memory stores the static state data which includes a model number of the copier; and the transmitter transmits the static state data which includes the model number of the copier.

61. A copier according to claim 58, wherein:

the memory stores the static state data which includes a serial number of the copier; and the transmitter transmits the static state data which includes the serial number of the copier.

62. A copier according to claim 58, wherein:

the memory stores the static state data which includes model characteristics of the copier; and the transmitter transmits the static state data which includes the model characteristics of the copier.

63. A copier, comprising:

a copying device;

a memory which stores semi-static state data;

a transmitter configured to transmit the semi-static state data to a separate device;

a receiver configured to receive data from the separate device which has been transmitted from the separate device after the transmitter transmits the semi-static state data; and a processor configured to process the data received by the means for receiving and for controlling the copier in response to the processing.

64. A copier according to claim 63, wherein:

the memory stores the semi-static state data which includes data which changes infrequently over the life of the copier; and the transmitter transmits the semi-static state data which includes the data which changes infrequently over the life of the copier.

65. A copier according to claim 63, wherein:

the memory stores the semi-static state data which includes an option configuration of the copier; and the transmitter transmits the semi-static state data which includes the option configuration of the copier.

66. A copier according to claim 63, wherein:

the memory stores the semi-static state data which includes a ROM version of the copier; and the transmitter transmits the semi-static state data which includes the ROM version of the copier.

67. A copier according to claims 43, 58, 48 or 63, wherein:

the memory is located within the copier.

68. A copier according to claims 58 or 63, further comprising:

a receiver configured to receive an identity of the separate device from the separate device.

69. A copier according to claims 58 or 63, wherein the separate device is an operation terminal, the copier further comprising:

a transmitter configured to transmit state data to a remote diagnostic station which is different from the separate device.

70. A copier according to claim 69, further comprising:

a receiver configured to receive data from the remote diagnostic station.

71. A copier according to claims 58 or 63, wherein the separate device is a remote diagnostic station, the copier further comprising:

a transmitter configured to transmit state data to an operation terminal which is different from the separate device.

72. A copier according to claim 71, further comprising:

a receiver configured to receive data from the operation terminal.

73. A copier according to claims 58 or 63, wherein:

the processor is a microprocessor.

74. A printer, comprising:

a printer engine which performs mechanical functions in response to a command from a separate device and includes a printing means;

a memory for storing static state data of the printer engine;

means for transmitting the static state data to the separate device;

means for receiving data from the separate device which has been transmitted from the separate device after the means for transmitting transmits the static state data; and means for processing the data received by the means for receiving and for controlling the printer in response to the processing.

75. A printer according to claim 74, wherein:

the memory stores the static state data which includes data which does not change over the life of the printer; and the means for transmitting transmits the static state data which includes the data which does not change over the life of the printer.

76. A printer according to claim 74, wherein:

the memory stores the static state data which includes a model number of the printer; and the means for transmitting transmits the static state data which includes the model number of the printer.

77. A printer according to claim 74, wherein:

the memory stores the static state data which includes a serial number of the printer; and the means for transmitting transmits the static state data which includes the serial number of the printer.

78. A printer according to claim 74, wherein:

the memory stores the static state data which includes model characteristics of the printer; and the means for transmitting transmits the static state data which includes the model characteristics of the printer.

79. A printer, comprising:

a printer engine which performs mechanical functions in response to a command from a separate device and which includes a printing means;

a memory for storing semi-static state data of the printer engine;

means for transmitting the semi-static state data to the separate device;

means for receiving data from the separate device which has been transmitted from the separate device after the means for transmitting transmits the semi-static state data; and means for processing the data received by the means for receiving and for controlling the printer in response to the processing.

80. A printer according to claim 79, wherein:

the memory stores the semi-static state data which includes data which changes infrequently over the life of the printer; and the means for transmitting transmits the semi-static state data which includes the data which changes infrequently over the life of the printer.

81. A printer according to claim 79, wherein:

the memory stores the semi-static state data which includes an option configuration of the printer; and the means for transmitting transmits the semi-static state data which includes the option configuration of the printer.

82. A printer according to claim 79, wherein:

the memory stores the semi-static state data which includes a ROM version of the printer; and the means for transmitting transmits the semi-static state data which includes the ROM version of the printer.

83. A printer according to claims 74 or 79, further comprising:

means for receiving character code data which is used to print corresponding characters by the means for printing, wherein the printer is a character printer.

84. A printer according to claims 74 or 79, further comprising:

means for receiving an identity of the separate device from the separate device.

85. A printer according to claims 74 or 79, wherein the separate device is an operation terminal, the printer further comprising:

means for transmitting state data to a remote diagnostic station which is different from the separate device.

86. A printer according to claim 85, further comprising:

means for receiving data from the remote diagnostic station.

87. A printer according to claims 74 or 79, wherein the separate device is a remote diagnostic station, the printer further comprising:

means for transmitting state data to an operation terminal which is different from the separate device.

88. A printer according to claim 87, further comprising:

means for receiving data from the operation terminal.

89. A printer according to claims 74 or 76 wherein:

the means for processing comprises a microprocessor.

90. A printer according to claims 74 or 79, further comprising:

a scanner means for scanning documents.

91. A printer, comprising:

a printing device;

a memory which stores static state data;

a transmitter configured to transmit the static state data to a separate device;

a receiver configured to receive data from the separate device which has been transmitted from the separate device after the transmitter transmits the static state data; and a processor configured to process the data received by the means for receiving and for controlling the printer in response to the processing.

92. A printer according to claim 91, wherein:

the memory stores the static state data which includes data which does not change over the life of the printer; and the transmitter transmits the static state data which includes the data which does not change over the life of the printer.

93. A printer according to claim 91, wherein:

the memory stores the static state data which includes a model number of the printer; and the transmitter transmits the static state data which includes the model number of the printer.

94. A printer according to claim 91, wherein:

the memory stores the static state data which includes a serial number of the printer; and the transmitter transmits the static state data which includes the serial number of the printer.

95. A printer according to claim 91, wherein:

the memory stores the static state data which includes model characteristics of the printer; and the transmitter transmits the static state data which includes the model characteristics of the printer.

96. A printer, comprising:

a printing device;

a memory which stores semi-static state data;

a transmitter configured to transmit the semi-static state data to a separate device;

a receiver configured to receive data from the separate device which has been transmitted from the separate device after the transmitter transmits the semi-static state data; and a processor configured to process the data received by the means for receiving and for controlling the printer in response to the processing.

97. A printer according to claim 96, wherein:

the memory stores the semi-static state data which includes data which infrequently changes over the life of the printer; and the transmitter transmits the semi-static state data which includes the data which infrequently changes over the life of the printer.

98. A printer according to claim 96, wherein:

the memory stores the semi-static state data which includes an option configuration of the printer; and the transmitter transmits the semi-static state data which includes the option configuration of the printer.

99. A printer according to claim 96, wherein:

the memory stores the semi-static state data which includes a ROM version of the printer; and the transmitter transmits the semi-static state data which includes the ROM version of the printer.

100. A printer according to claims 74, 91, 79, or 96, wherein:

the memory is located within the printer.

101. A printer according to claims 91 or 96, further comprising:

a device configured to receive character code data which is used to print corresponding characters by the printing device, wherein the printer is a character printer.

102. A printer according to claims 91 or 96, further comprising:

a receiver configured to receive an identity of the separate device from the separate device.

103. A printer according to claims 91 or 96, wherein the separate device is an operation terminal, the printer further comprising:

a transmitter configured to transmit state data to a remote diagnostic station which is different from the separate device.

104. A printer according to claim 103, further comprising:

a receiver configured to receive data from the remote diagnostic station.

105. A printer according to claims 91 or 96, wherein the separate device is a remote diagnostic station, the printer further comprising:

a transmitter configured to transmit state data to an operation terminal which is different from the separate device.

106. A printer according to claim 105, further comprising:

a receiver configured to receive data from the operation terminal.

107. A printer according to claims 91 or 96 wherein:

the processor is a microprocessor.

108. A printer according to claims 91 or 96, further comprising:

a scanner.

109. A computer which is separate from and for connection to a business office device, comprising:

means for receiving static state data transmitted from the business office device;

means for processing the static state data which has been received;

a disk unit connected to the means for processing; and means for transmitting data to the business office device, after the means for processing the static state data processes the static state data.

110. A computer according to claim 109, further comprising:

means for requesting the business office device to transmit the static state data.

111. A computer according to claim 110, wherein the means for requesting comprises:

means for requesting the business office device to transmit the static state data which is an identity of the business office device.

112. A computer according to claim 110, wherein the business office device is a copier and the means for requesting comprises:

means for requesting the business office device to transmit the static state data which is an identity of the copier.

113. A computer according to claim 110, wherein the business office device is a printer and the means for requesting comprises:

means for requesting the business office device to transmit the static state data which is an identity of the printer.

114. A computer according to claim 113, wherein the business office device is a character printer and the means for requesting comprises:

means for requesting the business office device to transmit the static state data which is an identity of the character printer.

115. A computer according to claim 109, wherein the means for requesting comprises:

means for requesting the business office device to transmit the static state data which is model information of the business office device.

116. A computer which is separate from and for connection to a business office device, comprising:

means for receiving semi-static state data transmitted from the business office device;

means for processing the semi-static state data which has been received;

a model identification receiving means for receiving a model identification of the business office device which was transmitted from the business office device;

a disk unit connected to the means for processing; and means for transmitting data to the business office device, after the means for processing the semi-static state data processes the semi-static state data.

117. A computer according to claim 116, further comprising:

means for requesting the business office device to transmit the semi-static state data.

118. A computer according to claim 117, wherein the means for requesting comprises:

means for requesting the business office device to transmit the semi-static state data which is an option configuration of the business office device.

119. A computer according to claim 117, wherein the business office device is a copier and the means for requesting comprises:

means for requesting the business office device to transmit the semi-static state data which is an option configuration of the copier.

120. A computer according to claim 117, wherein the business office device is a printer and the means for requesting comprises:

means for requesting the business office device to transmit the semi-static state data which is an option configuration of the printer.

121. A computer according to claim 120, wherein the business office device is a character printer and the means for requesting comprises:

means for requesting the business office device to transmit the semi-static state data which is an option configuration of the character printer.

122. A computer according to claim 117, wherein the means for requesting comprises:

means for requesting the business office device to transmit the semi-static state data which is a ROM version of the business office device.

123. A computer according to claims 110 or 117, further comprising:

means for requesting the business office device to transmit an identity of the business office device.

124. A computer according to claims 109, 110, 116, or 117, further comprising:

means for transmitting an identification of the computer to the business office device.

125. A computer according to claims 109 or 116 wherein:

the means for processing comprises a microprocessor.

126. A computer which is separate from and for connection to a business office device, comprising:

a receiver configured to receive static state data transmitted from the business office device;

a processor configured to process the static state data which has been received; and a transmitter configured to transmit data to the business office device, after the processor processes the static state data.

127. A computer according to claim 126, further comprising:

a device configured to request the business office device to transmit the static state data.

128. A computer according to claim 127, wherein the device configured to request comprises:

a device configured to request the business office device to transmit the static state data which is an identity of the business office device.

129. A computer according to claim 127, wherein the business office device is a copier and the device configured to request comprises:

a device configured to request the business office device to transmit the static state data which is an identity of the copier.

130. A computer according to claim 127, wherein the business office device is a printer and the device configured to request comprises:

a device configured to request the business office device to transmit the static state data which is an identity of the printer.

131. A computer according to claim 130, wherein the business office device is a character printer and the device configured to request comprises:

a device configured to request the business office device to transmit the static state data which is an identity of the character printer.

132. A computer according to claim 127, wherein the device configured to request comprises:

a device configured to request the business office device to transmit the static state data which is model information of the business office device.

133. A computer which is separate from and for connection to a business office device, comprising:

a receiver configured to receive semi-static state data transmitted from the business office device;

a processor configured to process the semi-static state data which has been received;

a model identification receiving device configured to receive a model identification of the business office device which was transmitted from the business office device; and a transmitter configured to transmit data to the business office device, after the processor processes the semi-static state data.

134. A computer according to claim 133, further comprising:

a device configured to request the business office device to transmit the semi-static state data.

135. A computer according to claim 134, wherein the device configured to request comprises:

a device configured to request the business office device to transmit the semi-static state data which is an option configuration of the business office device.

136. A computer according to claim 134, wherein the business office device is a copier and the device configured to request comprises:

a device configured to request the business office device to transmit the semi-static state data which is an option configuration of the copier.

137. A computer according to claim 134, wherein the business office device is a printer and the device configured to request comprises:

a device configured to request the business office device to transmit the semi-static state data which is an option configuration of the printer.

138. A computer according to claim 137, wherein the business office device is a character printer and the device configured to request comprises:

a device configured to request the business office device to transmit the semi-static state data which is an option configuration of the character printer.

139. A computer according to claim 134, wherein the device configured to request comprises:

a device configured to request the business office device to transmit the semi-static state data which is a ROM version of the business office device.

140. A computer according to claims 127 or 134, further comprising:

a device configured to request the business office device to transmit an identity of the business office device.

141. A computer according to claims 126, 127, 133, or 134, further comprising:

a transmitter configured to request an identification of the computer to the business office device.

142. A computer according to claims 126 or 133 wherein: the processor is a microprocessor.

143. A system for controlling a printer, comprising:

an input/output device which inputs commands and displays information; and a printer, including a printer engine for performing mechanical functions in response to a command from a separate device, connected to the input/output device, wherein the input/output device is selected from a plurality of different model input/output devices, each having capabilities of controlling the printer, and the printer is capable of being controlled by different models of input/output devices.

144. A system according to claim 143, wherein:

the printer comprises a scanner.

145. A system for controlling a copier, comprising:

an input/output device which inputs commands and displays information; and a copier which includes a copier engine which performs mechanical functions in response to a command from a separate device and which is connected to the input/output device, wherein the input/output device is selected from a plurality of different model input/output devices, each having capabilities of controlling the copier, and the copier is capable of being controlled by different models of input/output devices.

146. A system according to claims 143 or 145, wherein:

the input/output device comprises a microprocessor.

147. A system for controlling a printer, comprising:

an input/output means for inputting commands and displaying information; and a printer connected to the input/output means, wherein the input/output means is selected from a plurality of different model input/output means, each having capabilities of controlling the printer, and the printer is capable of being controlled by different models of input/output means.

148. A system according to claim 147, wherein:

the printer comprises a scanner means for scanning documents.

149. A system for controlling a copier, comprising:

an input/output means for inputting commands and displaying information; and a copier connected to the input/output means, wherein the input/output means is selected from a plurality of different model input/output means, each having capabilities of controlling the copier, and the copier is capable of being controlled by different models of input/output means.

150. A system according to claim 147 or 149, wherein: the input/output means comprises a microprocessor.

151. A business office device, comprising:

a memory which stores state data;

a transmitter configured to transmit the state data to a remote diagnostic station;

a transmitter configured to transmit the state data to an operation terminal which is different from the remote diagnostic station;

a receiver configured to receive commands from the operation terminal;

a processor configured to process commands which have been received including a command to start an operation of the business office device engine;

a receiver configured to receive data from the operation terminal which has been transmitted from the operation terminal after the transmitter configured to transmit the static state transmits the state data; and a processor configured to process the data received by the means for receiving and for controlling the business office device in response to the processing.

152. A business office device according to claim 151, further comprising:

an interface which connects the operation terminal to the business office device; and an interface connects to the remote diagnostic station to the business office device, wherein the interface which connects the operation terminal is connectable to the operation terminal at a same time as the interface which connects to the remote diagnostic station connects to the remote diagnostic station.

153. A business office device according to claim 151, wherein:

the business office device is a copier, and the business office device engine is a copier engine.

154. A business office device according to claim 151, wherein:

the business office device is a printer, and the business office device engine is a printer engine.

155. A system according to claim 143, wherein: each of the processors is a microprocessor.

156. A business office device for communication with an operation terminal, comprising:

a memory which stores state data of the business office device;

a transmitter configured to transmit the state data to the operation terminal;

a receiver configured to receive a start command from the operation terminal;

a processor configured to start an operation of the business office device engine in response to receiving the start command;

a receiver configured to receive an identity of the operation terminal from the operation terminal; and a processor configured to process the identity.

157. A business office device according to claim 156, wherein the business office device is a copier and the business office device engine is a copier engine.

158. A business office device according to claim 156, wherein the business office device is a printer and the business office device engine is a printer engine.

159. A business office device according to claim 158, wherein the business office device is a character printer and the business office device engine is a character printer engine.

160. A business office device according to claim 156, wherein:

each of the processors comprise a microprocessor.

161. A business office device according to claims 151 or 156, wherein the business office device engine comprises:

a scanner.

162. An operation terminal for communication with a business office device, comprising:

means for receiving state data from the business office device;

means for transmitting a start command to the business office device which causes the business office device to perform a mechanical function;

a disk unit disposed within the operation terminal; and means for transmitting an identity of the operation terminal to the business office device, the identity for processing by the business office device.

163. An operation terminal according to claim 162, wherein:

the means for receiving receives state data from the business office device which is a copier; and both of said means for transmitting transmit to the business office device which is a copier.

164. An operation terminal according to claim 162, wherein:

the means for receiving receives state data from the business office device which is printer; and both of said means for transmitting transmit to the business office device which is a printer.

165. An operation terminal according to claim 162, wherein:

the means for receiving receives state data from the business office device which is a character printer; and both of said means for transmitting transmit to the business office device which is a character printer.

166. An operation terminal for communication with a business office device, comprising:

a receiver configured to receive state data from the business office device;

a transmitter configured to transmit a start command to the business office device which causes the business office device to perform a mechanical function; and a transmitter configured to transmit an identity of the operation terminal to the business office device, the identity for processing by the business office device.

167. An operation terminal according to claim 166, wherein:

the receiver is configured to receive state data from the business office device which is a copier; and both of said transmitters are configured to transmit to the business office device which is a copier.

168. An operation terminal according to claim 166, wherein:

the receiver is configured to receive state data from the business office device which is printer; and both of said transmitters are configured to transmit to the business office device which is a printer.

169. An operation terminal according to claim 166, wherein:

the receiver is configured to receive state data from the business office device which is a character printer; and both of said transmitter are configured to transmit to the business office device which is a character printer.

170. An operation terminal according to claims 162 or 166, further comprising:

a microprocessor which processes the state data which has been received.

171. A business office device according to claims 1, 6 or 33, wherein:

the means for processing comprises a microprocessor.

* * * * *

UNITED STATES PATENT AND TRADEMARK OFFICE
CERTIFICATE OF CORRECTION

PATENT NO. : 5,649,120
DATED : JULY 15, 1997
INVENTOR(S) : TETSURO MOTOYAMA

It is certified that error appears in the above-identified patent and that said Letters Patent is hereby corrected as shown below:

In column 4, line 45, change "engine 10 end operation panel 20" to --engine 10 and operation panel 20--.

Signed and Sealed this

Thirtieth Day of December, 1997

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,649,120
DATED : JULY 15, 1997
INVENTOR(S) : TETSURO MOTOYAMA

It is certified that error appears in the above-identified patent and that said Letters Patent is hereby corrected as shown below:

In column 4, line 45, change "engine 10 end operation panel 20" to --engine 10 and operation panel 20--.

In column 11, Line 55, change "A copier according to claim 53," to --A copier according to claim 55,--.

In column 16, line 59, change "A computer according to claim 109," to --A computer according to claim 110,--.

In column 19, line 15, change "a transmitter configured to request" to --a transmitter configured to transmit--.

Signed and Sealed this

Twenty-fourth Day of February, 1998

Attest:

BRUCE LEHMAN

Attesting Officer          Commissioner of Patents and Trademarks